(12) United States Patent
Habermann et al.

(10) Patent No.: US 7,228,791 B2
(45) Date of Patent: *Jun. 12, 2007

(54) BAKING OVEN

(75) Inventors: Christian Habermann, Weiltingen (DE); Alexander Meier, Dürrwangen (DE); Dieter Knost, Dinkelsbühl (DE)

(73) Assignee: Werner & Pfleiderer Lebensmitteltechnik GmbH, Dinkelsbuhl (DE)

( * ) Notice: Subject to any disclaimer, the term of this patent is extended or adjusted under 35 U.S.C. 154(b) by 438 days.

This patent is subject to a terminal disclaimer.

(21) Appl. No.: 10/939,390

(22) Filed: Sep. 14, 2004

(65) Prior Publication Data

US 2005/0056156 A1    Mar. 17, 2005

(30) Foreign Application Priority Data

Sep. 16, 2003 (DE) .................. 103 42 657

(51) Int. Cl.
*A23L 1/00* (2006.01)
(52) U.S. Cl. .................. 99/330; 99/427; 99/467; 99/476; 99/516
(58) Field of Classification Search .................. 99/330, 99/331, 352–355, 339, 340, 467–476, 483, 99/423, 443 R, 443 C, 444–450, 516, 536; 126/20, 369, 20.1, 20.2, 21 A, 369.1; 219/400, 219/401, 388, 393, 411; 426/466, 293, 523; 425/253, 406
See application file for complete search history.

(56) References Cited

U.S. PATENT DOCUMENTS

| 2,123,040 | A | * | 7/1938 | Hanak .................. 99/352 |
| 2,249,152 | A | | 7/1941 | Marshall |
| 4,887,524 | A | | 12/1989 | Ellis-Brown |
| 5,129,384 | A | * | 7/1992 | Parks .................. 126/21 A |
| 5,394,791 | A | * | 3/1995 | Vallee .................. 99/427 |
| 5,530,223 | A | * | 6/1996 | Culzoni et al. .................. 219/401 |
| 5,558,010 | A | * | 9/1996 | Shelton .................. 99/468 |
| 5,615,603 | A | * | 4/1997 | Polin .................. 99/331 |
| 5,615,606 | A | | 4/1997 | Vos |
| 5,676,051 | A | * | 10/1997 | Sinemus .................. 99/476 |
| 5,694,835 | A | * | 12/1997 | Mangina .................. 99/468 |

(Continued)

FOREIGN PATENT DOCUMENTS

DE  29 08 638  9/1979

(Continued)

*Primary Examiner*—Timothy F. Simone
(74) *Attorney, Agent, or Firm*—Browdy and Neimark, PLLC

(57) ABSTRACT

A baking oven for preparing dough pieces comprises a supply section with an inlet for the supply of dough pieces; a baking chamber and a discharge section with an outlet for the discharge of baked dough pieces. A recirculating-air arrangement comprises a source producing a flow of recirculating air, a recirculating-air heating device and a recirculating-air guiding conduit which is sectionally formed by the baking chamber. A conveyor assembly delivers dough pieces from the inlet to the outlet. To this end, the conveyor assembly comprises a plurality of continuous conveyor belts which pass along deflection pulleys and are disposed one in relation to the other in the baking chamber for transfer by gravity of the dough pieces from one to another of two adjacent continuous conveyor belts. The result is a baking oven in which, during baking, the dough pieces can be moved and spread as uniformly as possible.

10 Claims, 6 Drawing Sheets

U.S. PATENT DOCUMENTS

| | | | | |
|---|---|---|---|---|
| 5,704,278 A | * | 1/1998 | Cross | 99/427 |
| 5,732,614 A | * | 3/1998 | Oslin | 99/341 |
| 5,816,234 A | * | 10/1998 | Vasan | 126/21 A |
| 6,237,469 B1 | * | 5/2001 | Stritzl et al. | 99/330 |
| 6,453,802 B1 | * | 9/2002 | Manganiello et al. | 99/330 |

FOREIGN PATENT DOCUMENTS

| | | |
|---|---|---|
| DE | 30 12 043 A1 | 10/1981 |
| WO | WO 02/051249 A1 | 7/2002 |

* cited by examiner

BAKING OVEN

BACKGROUND OF THE INVENTION

1. Field of the Invention

The invention relates to a baking oven comprising a casing, a supply section with an inlet for dough pieces to be supplied, a baking chamber; a discharge section with an outlet for baked dough pieces to be discharged, a recirculating-air assembly, including a source that produces a flow of recirculating air, a recirculating-air heating device, a recirculating-air guiding conduit sectionally formed by the baking chamber; a conveyor assembly which transports dough pieces from the inlet to the outlet.

2. Background Art

A baking oven of the generic type is known from prior public use. Baking ovens of the generic type are still in need of improvement as far as the baking time of dough pieces and their implementation is involved.

SUMMARY OF THE INVENTION

It is an object of the present invention to develop a baking oven of the type mentioned at the outset for achievement of reduced baking times accompanied with improved implementation of the baking oven. Moreover, optically attractive design of the conveyor assembly is required, enabling the baking oven to be used in particular in bakery shops.

According to the invention, this object is attained in a baking oven having a conveyor assembly comprising a plurality of continuous conveyor belts which pass along deflection pulleys and are arranged one in relation to the other in the baking chamber such that transfer to the dough pieces from one to another of two adjacent continuous conveyor belts takes place by gravity.

According to the invention, more efficient baking has been found to result when dough pieces move in a flow of recirculating air on the one hand and when they are spread as uniformly as possible in the baking chamber on the other. Passing the dough pieces from one continuous conveyor belt to another can in particular be embodied in such a way that dough pieces are transferred and/or turned over automatically, which works in favor of uniform exposure of the dough pieces to recirculation air.

Arranging of the continuous conveyor belts being disposed one in relation to the other for zigzagging conveyance in the baking chamber ensures a long conveying distance implemented in a simultaneously compactly configured baking chamber. An conveying assembly of this type can be made optically attractive.

Continuous conveyor belts being gas-permeable improve the flow of recirculating air around dough pieces.

A gate through which passes the conveyor belt prevents heat from escaping from the baking chamber upon the supply and discharge of dough pieces.

Implementing a gate comprising two sliding doors, successive in the conveying direction, which, in an on position, leave the conveying path open and, in an off position, closes the baking chamber for heat insulation, is not complicated.

A discharge section comprising a discharge conveyor assembly, in particular a continuous discharge belt, which is controllably displaceable in a vertical direction in relation to the casing, taking baked dough pieces from one of the continuous conveyor belts optionally and in dependence on pre-selection, offers the possibility of pre-setting the baking time without changing the pace of the conveyor assembly. It is therefore possible to embody the baking oven for various types of articles that need varying baking times to be worked in a single charge of the baking oven.

A recirculating-air control unit which is adjustable from one of two set positions to another for the recirculating air to flow through the recirculating-air guiding conduit on a defined flow path of at least two given flow paths provides for more uniform baking conditions of the dough pieces conveyed in the baking chamber. With exposure of dough pieces to recirculating air taking place along at least two flow paths, recirculation-air temperature gradients will even out along the flow of recirculating air.

A recirculating-air conduction unit being a valve element having a cylindrical two-way valve gate, two valve elements being preferably provided, can be produced at a low cost.

A recirculating-air control system being designed for intermittent switch-over of the recirculating-air flow path from one to another of the various given flow paths can easily be put into practice.

Heating the baking oven at the start of a baking job is facilitated by an embodiment of the baking oven having a vacuum pump which is connected to the baking chamber, being controllably switched on for adjustment, in the baking chamber, of a given partial vacuum. Baking the dough pieces in their own vapour is simultaneously implemented by the action of a vacuum pump.

By alternative of, or in addition to the baking oven having a vacuum pump which is connected to the baking chamber, being controllably switched on for adjustment, in the baking chamber, of a given partial vacuum, provision can be made for a vapour-treatment arrangement being connected to the baking chamber, being controllably switched on for vapour supply to the baking chamber. The vapour-treatment arrangement provides for controlled humidity of the dough pieces, which improves baking results. In combination with the vacuum pump, it is possible to moisten the dough pieces uniformly, which is still another improvement of the baking results.

Details of the invention will become apparent from the ensuing description of exemplary embodiments of the invention, taken in conjunction with the drawing.

DESCRIPTION OF A PREFERRED EMBODIMENTS

Figure 1:
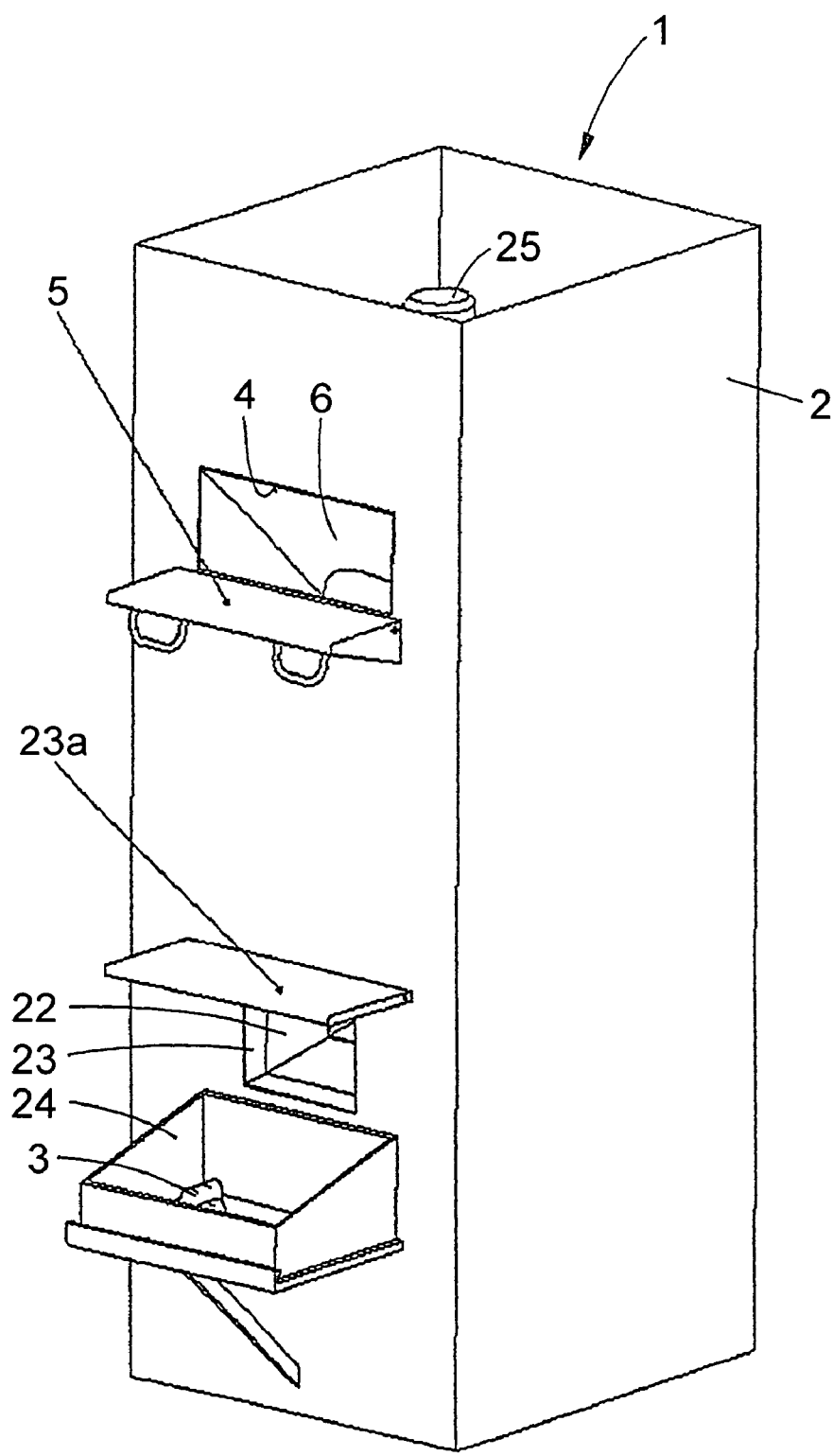
FIG. 1 is a perspective view of a baking oven according to the invention.
Figure 2:
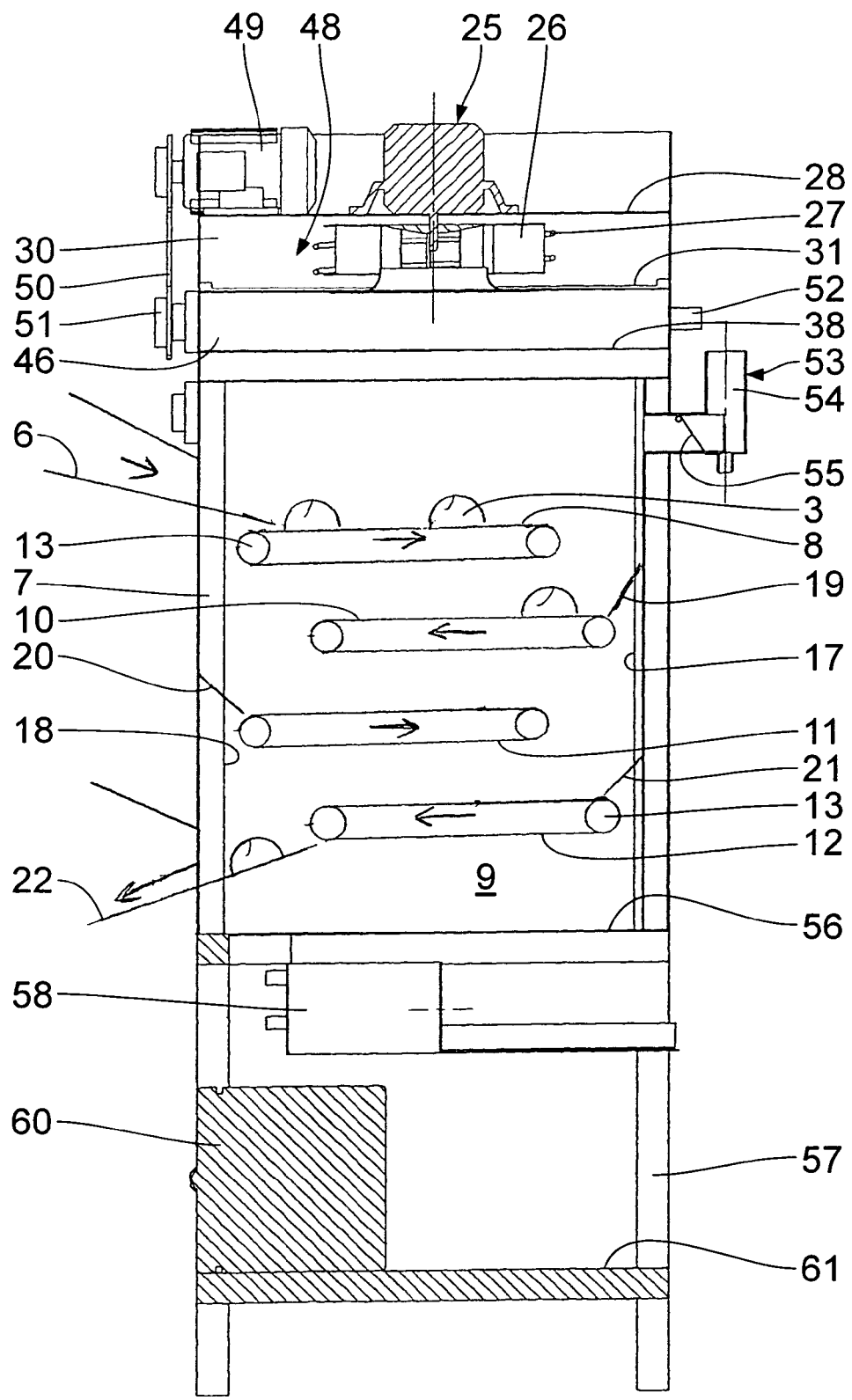
FIG. 2 is a vertical sectional view of the baking oven of FIG. 1 with the exterior casing removed.
Figure 3:
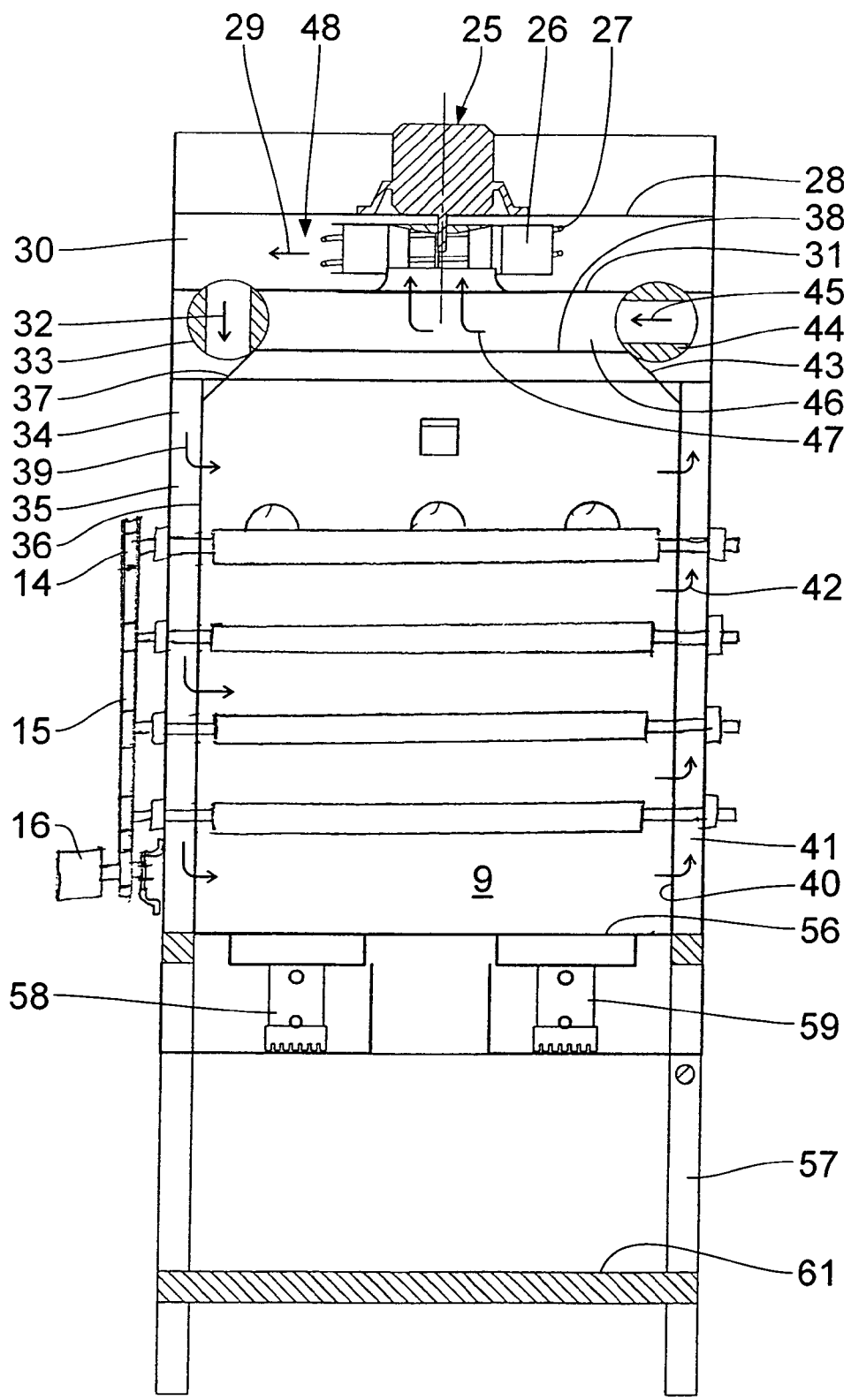
FIG. 3 is a vertical sectional view, perpendicular to the cutting plane of FIG. 2, of the baking oven of FIG. 2 with the exterior casing removed.

FIGS. 1 to 3 show a first embodiment of a baking oven designated by 1 in its entirety. It comprises an exterior casing 2 of a square area of approximately 1 m$^2$ and a height of approximate 2 m. Dough pieces 3, for instance deep frozen rolls, arrive inside the baking oven 1 through an inlet 4 which can be shut manually by a door 5.

A loading doorway 6 is flush with the door 4; it slopes downwards, leading dough pieces into an interior casing 7 of the baking oven 1. The doorway 6 ends in the interior casing 7 above a first uppermost, continuous conveyor belt 8 which, as seen in FIG. 2, transports the dough pieces 3 from the left to the right in a baking chamber 9 that is enclosed by the interior casing 7. In addition to the continuous conveyor belt 8, the baking oven 1 includes a total of another three or more continuous conveyor belts 10, 11, 12 one below the other in the baking chamber 9. The conveying direction of the continuous conveyor belts 8 and 10 to 12 reverses from the top to the bottom so that, in addition to the conveyor belt 8, also the next but one conveyor belt 11 has a dough-piece-3 conveying direction from the left to the right in FIG. 2, whereas the two other continuous conveyor belts 10, 12 define a dough-piece-3 conveying direction from the right to the left in FIG. 2. The continuous conveyor belts 8 and 10 to 12 are led by two deflection pulleys 13 which are mounted on the interior casing 7, one of them at a time being driven. To this end, the driven deflection pulleys 13 include a pinion 14 which cooperates with a driving chain 15 outside the interior casing 7. The driving chain 15 is actuated by a driving motor 16 which is flanged to the interior casing 7.

The continuous conveyor belts 8 and 10 to 12 are displaced from one another in the conveying direction, defining a zigzagging travel in the baking chamber 9. To this end, discharge ends of the two continuous belts 8, 11 that convey from the left to the right in FIG. 2 are spaced from an opposite inside wall 17 of the interior casing 7 to such an extent that dough pieces 3 are able to pass between the discharge ends and the inside wall 17 under the action of gravity. The discharge ends of the two continuous belts 10, 12 of conveyance from the right to the left in FIG. 2 are spaced from the inside wall 18, opposite the inside wall 17, of the interior casing 7 so that a passage of dough pieces 3 under the action of gravity is possible between these discharge ends and the inside wall 18 too. Upon passage by gravity, the dough pieces 3 are handed over to the respectively ensuing continuous conveyor belt 10 to 12 below. In proximity to the supply ends of the continuous belts 10 to 12, inclined baffle plates 19 to 21 for the dough pieces 3 are mounted on the inside walls 17 and 18, preventing the dough pieces 3 from dropping between the loading ends of the conveyor belts 10 to 12 and the adjacent inside walls 17, 18. A discharge passageway 22 is allotted to the discharge end of the lowermost conveyor belt 12, aligning with an outlet 23 of the exterior casing 2. The outlet 23 can be shut by a flap 23a. Underneath the outlet 23, provision is made for a bin 24 of baked dough pieces 3 that is supported by the exterior casing 2.

While conveyed in the baking oven 1, the dough pieces 3 are exposed to recirculation air. It originates from a source 25 of recirculating air that includes a fan 26 and is heated by a heating spiral 27. The source 25 of recirculation air, which is disposed above the baking chamber 9, is supported by a heat-insulated, intermediate bottom 28 in the interior casing 7. Of course, the source 25 may just as well be disposed by the side of the baking chamber 9.

FIG. 3 illustrates a first flow path of generated recirculation air through the baking chamber 9. As roughly outlined by an arrow of flow direction 29 in FIG. 3, the recirculation air originating from the source 25 starts by flowing through a first recirculating-air chamber 30 which is disposed between the intermediate bottom 28 and a parallel, second intermediate bottom 31 that is disposed there-under. As roughly outlined by an arrow of flow direction 32, the air then flows downwards through a first valve element 33 which includes a cylindrical two-way valve gate. The valve element 33 is rotatable about a horizontal axis that coincides with the longitudinal axis of the cylindrical valve gate and is rotationally positioned for releasing a vertical connection of flow between the first recirculating-air chamber 30 and a second recirculating-air chamber 34. The chamber 34 is laterally defined by a left side wall 35, in FIG. 3, of the interior casing 7 and a parallel, gas-permeable intermediate wall 36 as well as an inclined air baffle plate 37 which extends between the intermediate wall 36 and a third intermediate bottom 38 that is disposed below the second intermediate bottom 31.

As roughly outlined by the arrows of flow direction 39 in FIG. 3, the recirculation air flows from the second recirculating-air chamber 34 through the gas-permeable intermediate wall 36 into the baking chamber 9. The recirculating air then flows around the dough pieces 3 in the baking chamber 9 and is able even to pass through the continuous conveyor belts 8 and 10 to 12. In this way the dough pieces 3 are being baked while transported by the continuous belts 8 and 10 to 12. As seen in FIG. 3 on the right, the recirculating air, after flowing around the dough pieces 3, again passes a gas-permeable intermediate wall 40 opposite the intermediate wall 36, flowing upwards through a third recirculating-air chamber 41 which is disposed on the right of the intermediate wall 40 in FIG. 3, mirroring the second recirculating-air chamber 34, as roughly outlined by arrows of flow direction 42 in FIG. 3. In doing so, the recirculation air flows past an air baffle plate 43, which also defines the third recirculating-air chamber 41 and is mounted for inclination between the intermediate wall 40 and the intermediate bottom 38, mirroring the air baffle plate 43. A second valve element 44 is provided above the second air baffle plate 43. It is configured in the same way as the first valve element 33, however rotated by 90° in relation thereto, pre-determining a horizontal recirculating-air flow connection. Consequently, as roughly outlined by an arrow of flow direction 45 in FIG. 3, the recirculating air streams from the third recirculating-air chamber 41 into a fourth recirculating-air chamber 46. In FIG. 3, this chamber 46 is defined laterally by the two valve elements 33 and 44; it is defined upwards by the second intermediate bottom 31 and downwards by the third intermediate bottom 38 that interconnects the two air baffle plates 37 and 43. From the fourth recirculating-air chamber 46, the air flows through passages in the second intermediate bottom 31 and back to the source of recirculating air 25, as roughly outlined by the arrows of flow direction 47. The recirculating-air chambers 30, 34, 41 and 46 combine with the baking chamber 9, forming a recirculating-air guiding channel 48.

In its position of rotation as specified, the first valve element 33 seals the fourth recirculating-air chamber 46 between the second intermediate bottom 31 and the third intermediate bottom 38 so that recirculation air, aspirated by the fan 25, again flows into the first recirculating-air chamber 30.

The valve elements 33 and 44 switch intermittently from the above first positions of rotation, in which they release the first flow path seen in FIG. 3, to second positions of rotation, which are rotated by 90° as compared to the first positions of rotation and in which they release a second flow path. In case of the second flow path, the first valve element 33 releases a horizontal passage and the second valve element 44 releases a vertical passage so that, in case of the second flow path, the recirculation air passes from the first recirculating-air chamber 30 into the third recirculating-air chamber 41; then through the right intermediate wall 40 (in FIG.

3) into the baking chamber 9; from there it passes through the left intermediate wall 36 into the fourth recirculating-air chamber 46; and, aspirated by the fan 25, it flows again into the first recirculating-air chamber 30. Conditioned by this kind of flow-path switching, dough pieces 3, which are off-center on the continuous conveyor belts 8, 10 to 12 in FIG. 3, are for example being exposed, during half the period of exposure, to recirculating air that has had a shorter way through the baking chamber 9 and, during the other half period of exposure, to recirculating air that has had a longer way through the baking chamber 9. In combination with the fact that the dough pieces 3 are conveyed from the top to the bottom through the baking chamber 9, what will result, regardless of the respective position of the individual dough pieces 3 on the continuous conveyor belts 8, 10 to 12, are integrally comparable baking conditions so that the dough pieces 3 are being baked uniformly. Any temperature gradients of the recirculating air along the two flow paths are balanced in this way.

Upon switch-over from one flow path to another, the valve elements 33, 44 are rotated by means of a valve-element-driving motor 49. It is mounted on the first intermediate bottom 28 of the interior casing 7, via a driving belt 50 actuating transmission gearwheels 51 which are non-rotatably joined to shafts 52, the shafts 52 again being non-rotatably joined to the valve elements 33, 44 and flush with the axes of rotation thereof.

The pressure that prevails in the baking chamber 9 is defined by a vapour discharge arrangement 53 which includes a vapour discharge conduit 54 that leads out of the baking chamber 9, elbowing upwards by 90°; as long as there is no overpressure in the baking chamber 9, the conduit 54 is closed by a vapour discharge flap 55.

Below the baking-chamber bottom 56, provision is made for two vapour-treatment modules 58, 59 which are supported by a support structure 57. They serve for producing water vapour by which to proceed with controlled humidification of the dough pieces 3 in the baking chamber 9 during a baking job.

During the baking operation, the conveyor-belt-driving motor 16, the source of recirculating air 25, the valve-element-driving motor 49 and the vapour-treatment modules 58, 59 are triggered by a central control module 60 which is supported by an intermediate bottom 61 of the support structure 57.

It is possible to regulate the baking time by way of the conveying rate of the continuous belts 8, 10 to 12. The baking time may for instance vary from 20 to 30 minutes.

Figure 4:
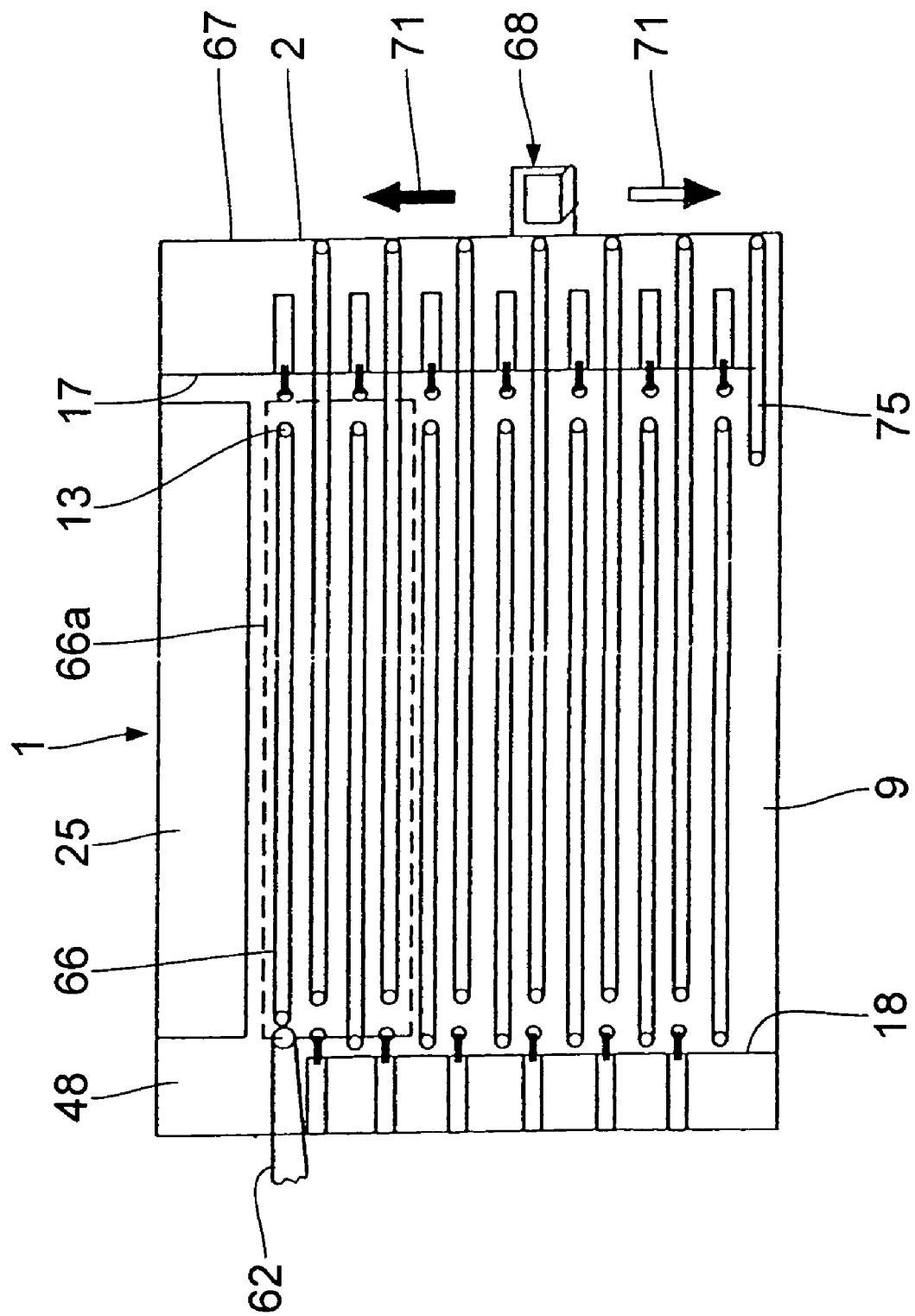
FIG. 4 is a diagrammatic sectional view, similar to FIG. 2, of another embodiment of a baking oven according to the invention.
Figure 5:
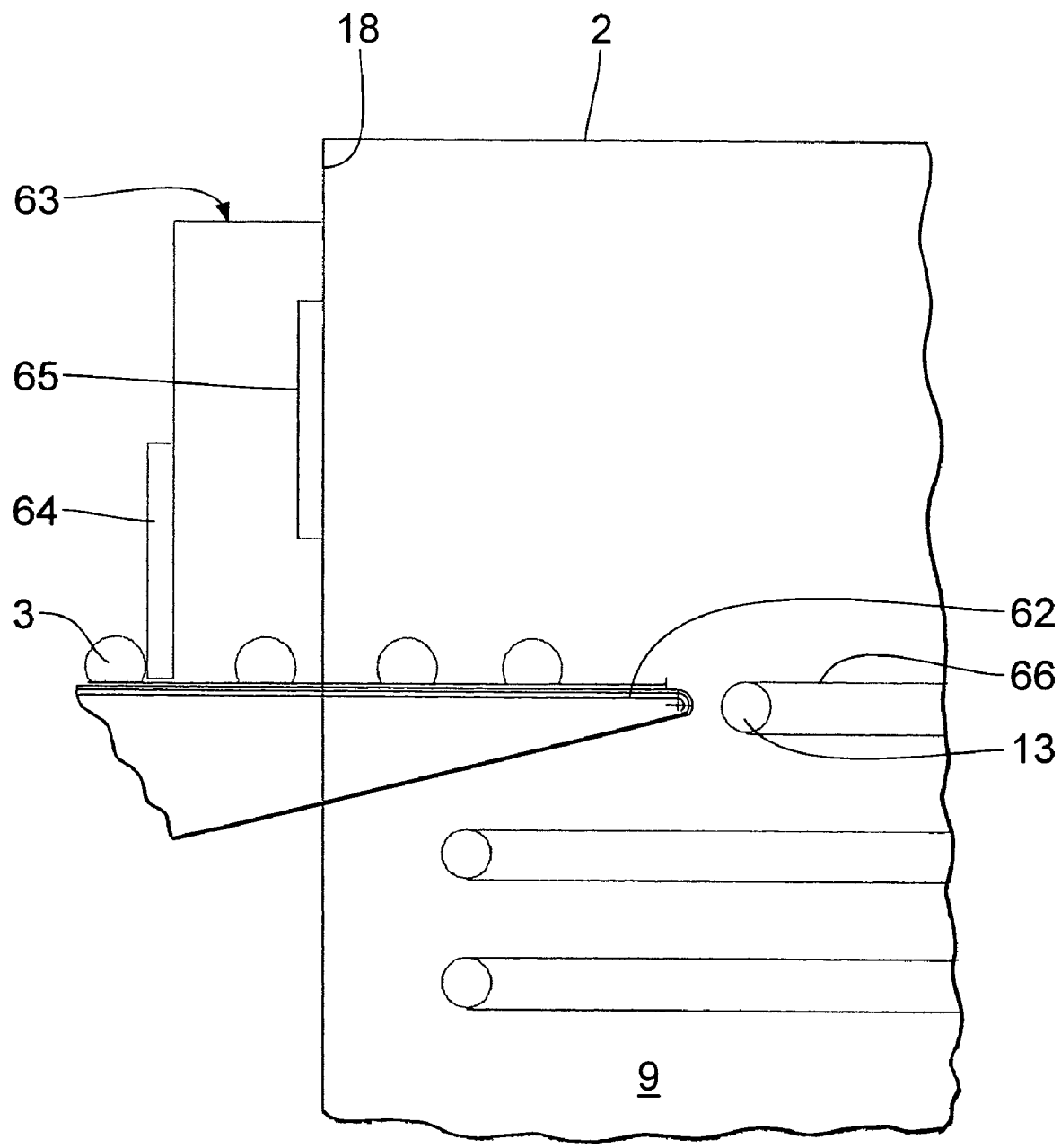
FIG. 5 is an illustration, on an enlarged scale, of details of a supply section of the baking oven of FIG. 4.
Figure 6:
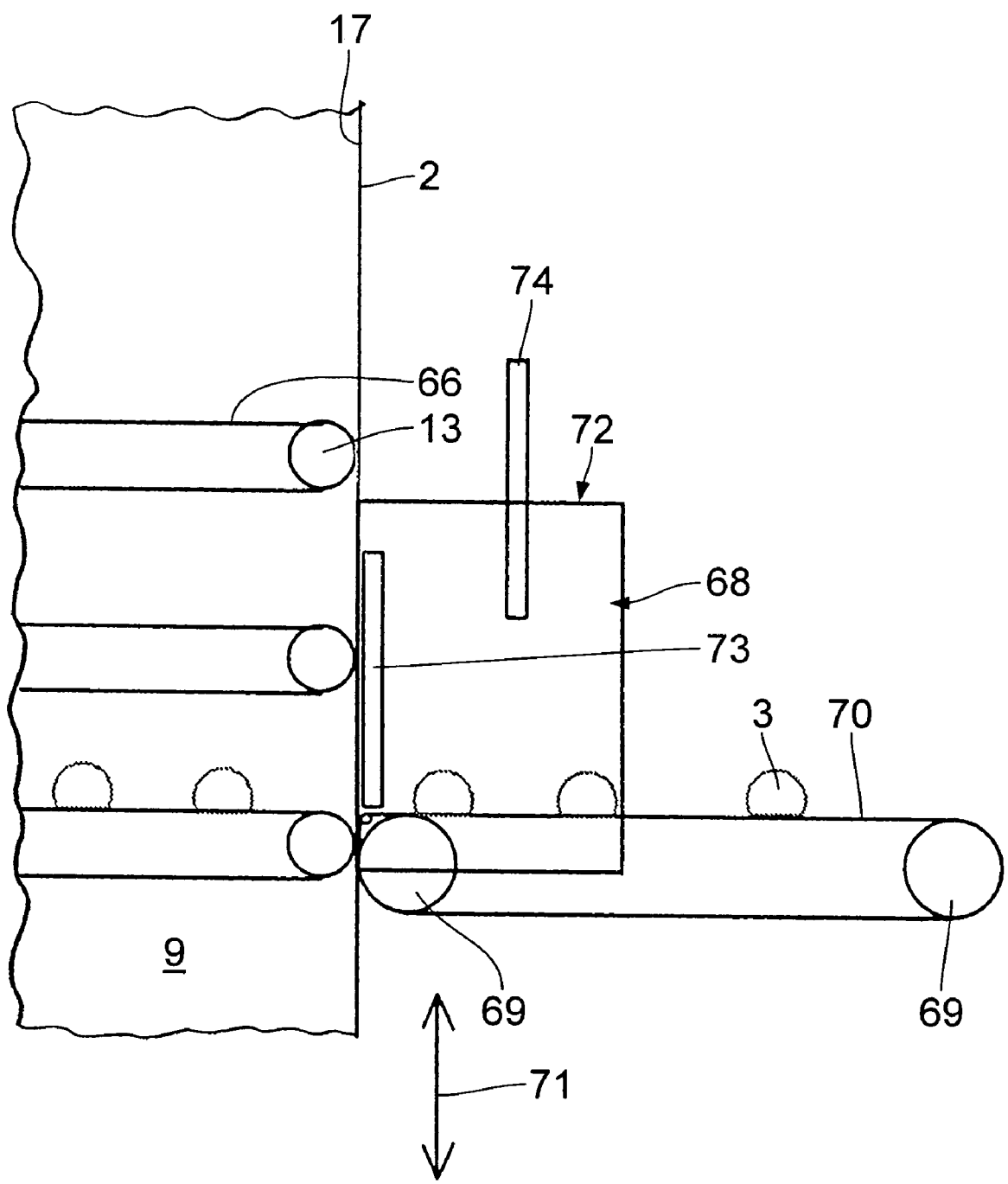
FIG. 6 is an illustration, on an enlarged scale, of details of a discharge section of the baking oven of FIG. 4.

FIGS. 4 to 6 illustrate another embodiment of a baking oven with continuous conveyor belts. Components that correspond to those described with reference to the embodiment of FIGS. 1 to 3 have the same reference numerals and will not be explained again in detail.

In the embodiment of FIGS. 4 to 6, any addition of dough pieces 3 takes place via a supply belt 62 which is illustrated in the drawing with part of it being broken away; further details can be seen in FIG. 5. Instead of an inlet, the baking oven 1 of the embodiment according to FIGS. 4 to 6 comprises a supply gate 63 which cannot be seen in the diagrammatic illustration of FIG. 4. The supply gate 63 includes two sliding doors 64, 65 which are disposed one after the other in the conveying direction of the supply belt 62 and which slide vertically.

The sliding door 64 which is the first to be reached by the dough pieces 3 when they are conveyed on the supply belt 62 is shown in an off position in FIG. 5, closing the baking chamber 9 of the baking oven 1 of the embodiment according to FIGS. 4 to 6 for heat-insulation. In doing so, the bottom front wall of the sliding door 64 contacts the conveying strand of the supply belt 62, sealing it for heat insulation. As seen in FIG. 5, the second sliding door 65 of the supply gate 63 is in an on position, enabling dough pieces 3 to pass through. Whenever one of the two sliding doors 64, 65 is in the on position, the other will be in the off position, heat insulation of the baking oven 9 always being ensured by at least one of the two sliding doors 64, 65. The sliding doors 64, 65 open alternately so that dough pieces 3 may enter the baking chamber 9 through the supply gate 63. Coming from the discharge end of the supply belt 62, the dough pieces 3 are then being transferred to a first top continuous conveyor belt 66.

The baking oven 1 of the embodiment according to FIGS. 4 to 6 includes an overall of thirteen continuous conveyor belts 66, one below the other, which are displaced from one another in the same way as the continuous conveyor belts 8, 10 to 12 of the embodiment according to FIGS. 1 to 3, defining a zigzagging travel in the baking chamber 9. Provision may just as well be made for another number of continuous conveyor belts, for instance fifteen. The four uppermost continuous conveyor belts 66 define a dough-piece-3 defrosting zone 66a in the baking chamber 9. A vacuum pump (not shown) serves to regulate given negative pressure in the baking chamber 9 of the embodiment of FIGS. 4 to 6, enabling the dough pieces 3 to be heated more rapidly in the defrosting zone 66a. Simultaneously, the dough pieces 3 can start baking in their own vapour in the defrosting zone 66a.

Being displaced in position, the discharge ends of every second continuous conveyor belt 66 are disposed in vicinity to a right side wall 67, in FIG. 4, of the baking oven 1 of FIGS. 4 to 6. Depending on which of these discharge ends has optionally been pre-selected, the dough pieces 3 can be transferred to a discharge conveyor assembly 68 which is illustrated diagrammatically in FIG. 4 and in detail in FIG. 6. The discharge conveyor assembly 68 comprises a continuous discharge belt 70 led along two deflection pulleys 69. The continuous discharge belt 70, inclusive of the deflection pulleys 69, can be controllably relocated vertically in relation to the exterior casing 2, which is roughly outlined by a double-headed arrow 71 in FIGS. 4 and 6.

Depending on the continuous conveyor belt 66 from which transfer to the continuous discharge belt 70 takes place, an outlet will open in the side wall 67, allocated to the respective continuous conveyor belt 66. A discharge gate 72 which, together with the continuous discharge belt 70, can be shifted in the direction of the double-headed arrow 71 precludes heat from escaping to an unnecessary extent through this outlet from the baking chamber 9. To this end, the discharge gate 72 includes two sliding doors 73, 74 which, as explained in connection with the sliding doors 64, 65 of the supply gate 63, can be alternately relocated from an on position into an off position in such a way that at least one of the sliding doors 73, 74 will remain in the off position.

For control of the baking-process duration, a vertical position of the discharge conveyor assembly 68 is given by the aid of a control unit (not shown in the embodiment of FIGS. 4 to 6) in such a way that the discharge conveyor assembly 68 cooperates with a given continuous conveyor belt 66. For baked-dough-piece-3 discharge, this given continuous conveyor belt 66 is being actuated in such a way that baked dough pieces 3 are being conveyed towards the discharge conveyor assembly 68. The baked dough pieces 3 then leave the baking chamber 9 through the passage that is allocated to the given continuous conveyor belt 66 and through the discharge gate 72, from where it is being conveyed via the continuous discharge belt 70 to a corresponding place of storing, for example a bin. The more upwards removal of baked dough pieces 3 from the baking chamber 9 takes place by the discharge conveyor assembly 68, the shorter is the baking time of the dough pieces 3. If use is made of the maximum baking time achievable by the baking oven 1 of the embodiment of FIGS. 4 to 6, then the discharge conveyor assembly 68 is moved completely downwards so that it cooperates with a lowermost, short transfer conveyor belt 75 underneath the lowermost continuous conveyor belt 66 in the baking chamber 9.

The continuous conveyor belts 8, 10 to 12, 66 and 75 may for instance be embodied as flexible wire mesh.

The embodiments of the baking oven according to FIGS. 1 to 6 can be operated in particular in such a way that various types of dough pieces 3 needing different baking times are being treated in one and the same charge of the baking oven 1.

What is claimed is:

1. A baking oven (1) for preparing dough pieces (3), comprising
    a casing (2);
    a supply section (6; 62) with an inlet (4) for dough pieces (3) to be supplied;
    a baking chamber (3);
    a discharge section (22; 68) with an outlet (23) for baked dough pieces (3) to be discharged;
    a recirculating-air assembly, including
        a source (25) that produces a flow of recirculating air,
        a recirculating-air heating device (27);
        a recirculating-air guiding conduit (48) sectionally formed by the baking chamber (9);
    a conveyor assembly (8, 10 to 12; 66, 75) which transports dough pieces (3) from the inlet (4) to the outlet (23); wherein
    the conveyor assembly (8, 10 to 12; 66, 75) comprises a plurality of continuous conveyor belts (8, 10 to 12; 66, 75) which pass along deflection pulleys (13) and are arranged one in relation to the other in the baking chamber (9) such that transfer to the dough pieces (3) from one to another of two adjacent continuous conveyor belts (8, 10 to 12; 66, 75) takes place by gravity,
    at least one of the supply and the discharge section is a gate (63, 72) through which passes the conveyor belt (62, 70).

2. A baking oven according to claim 1, wherein the continuous conveyor belts (8, 10 to 12; 66, 75) are disposed one in relation to the other for zigzagging conveyance in the baking chamber (9).

3. A baking oven according to claim 1, wherein the continuous conveyor belts (8, 10 to 12; 66, 75) are gas-permeable.

4. A baking oven according to claim 1, wherein the gate (63,72) comprises two sliding doors (64, 65; 73, 74), successive in the conveying direction, which, in an on position, leave the conveying path open and, in an off position, close the baking chamber (9) for heat insulation.

5. A baking oven according to claim 1, wherein the discharge section comprises a discharge conveyor assembly (68), in particular a continuous discharge belt (70), which is controllably displaceable in a vertical direction (71) in relation to the casing (2), taking baked dough pieces (3) from one of the continuous conveyor belts (66, 75) optionally and in dependence on pre-selection.

6. A baking oven according to claim 1, having a recirculating-air control system (60) comprising at least one recirculating-air conduction unit (33, 44) which is adjustable from one of two set positions to another for the recirculating air to flow through the recirculating-air guiding conduit (48) on a defined flow path of at least two given flow paths.

7. A baking oven according to claim 6, wherein the recirculating-air conduction unit (33, 44) is a valve element having a cylindrical two-way valve gate, two valve elements being preferably provided.

8. A baking oven according to claim 6, wherein the recirculating-air control system (60) is designed for intermittent switch-over of the recirculating-air flow path from one to another of the various given flow paths.

9. A baking oven according to claim 1, having a vacuum pump which is connected to the baking chamber (9), being controllably switched on for adjustment, in the baking chamber (9), of a given partial vacuum.

10. A baking oven according to claim 1, having a vapour-treatment arrangement (58, 59), which is connected to the baking chamber (9), being controllably switched on for vapour supply to the baking chamber (9).

* * * * *